April 4, 1961
R. M. DYKSTERHOUSE
2,978,554
BALL CONTACT SWITCH
Filed June 23, 1958
2 Sheets-Sheet 1
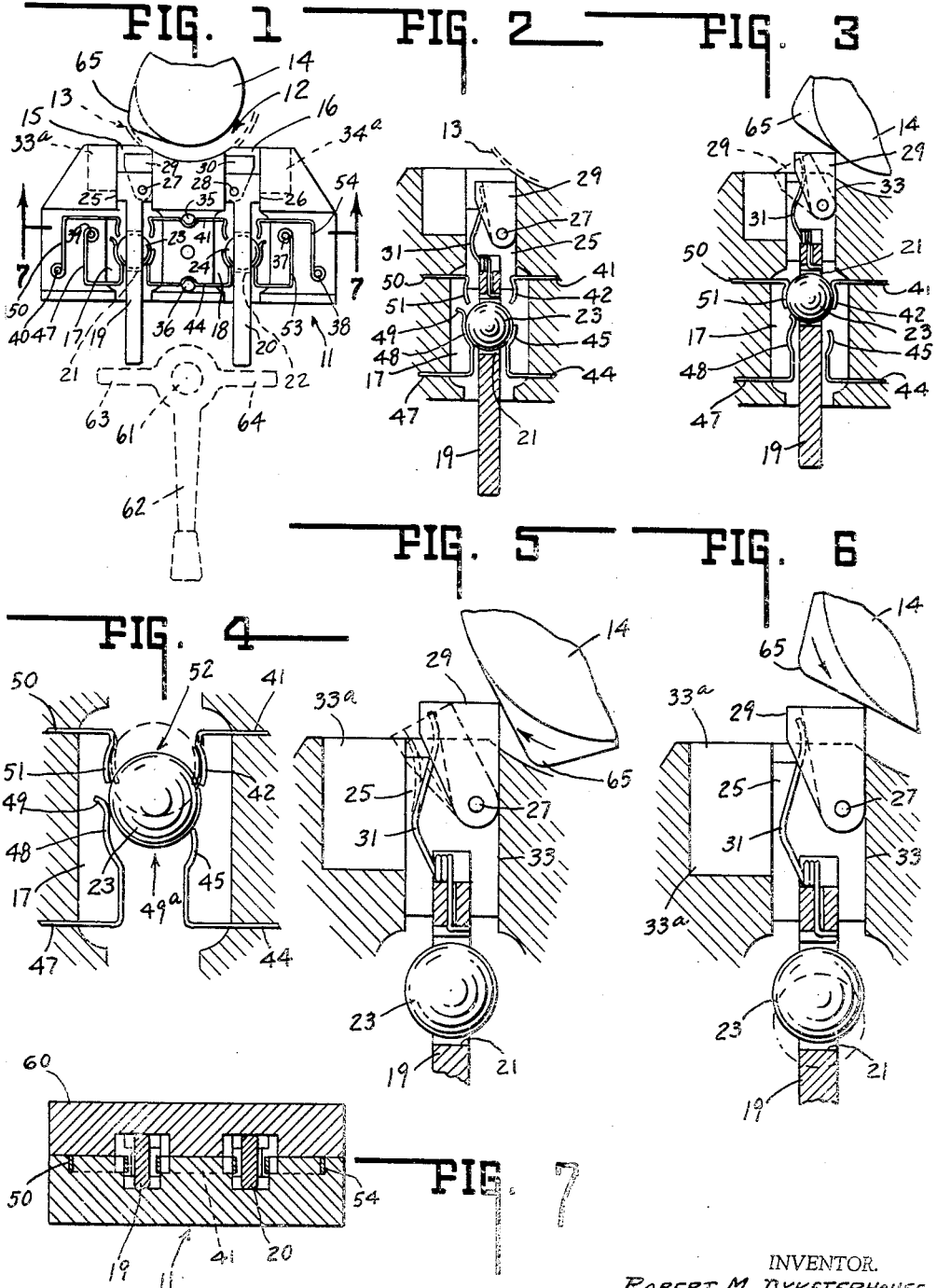
INVENTOR.
ROBERT M. DYKSTERHOUSE.
BY
Lockwood, Galt, Woodard & Smith.
ATTORNEYS.

April 4, 1961
R. M. DYKSTERHOUSE
2,978,554
BALL CONTACT SWITCH
Filed June 23, 1958
2 Sheets-Sheet 2
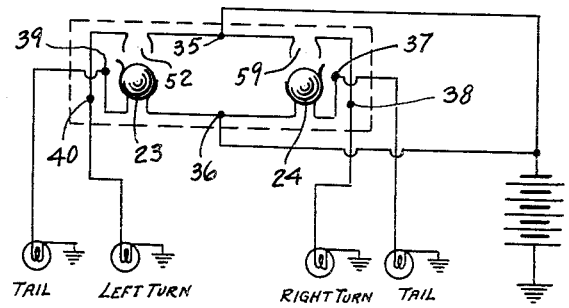
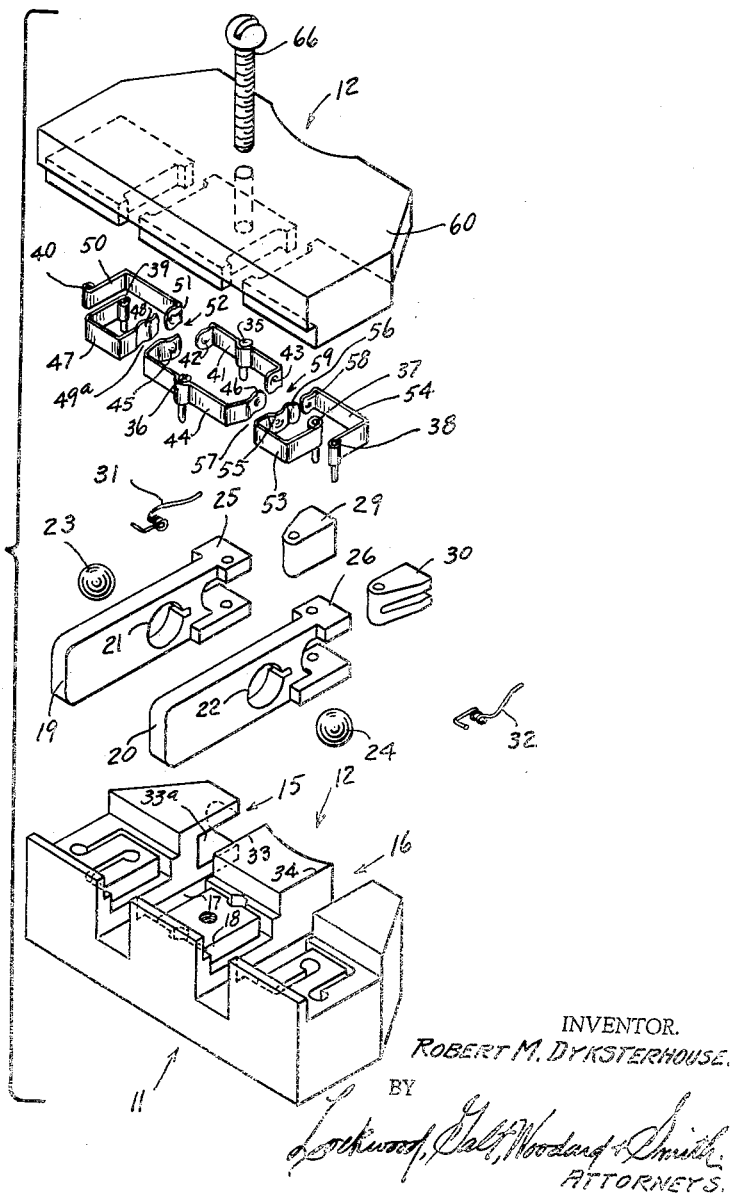
INVENTOR.
ROBERT M. DYKSTERHOUSE.
BY
ATTORNEYS.

United States Patent Office 2,978,554
Patented Apr. 4, 1961

2,978,554

BALL CONTACT SWITCH

Robert M. Dyksterhouse, 103 Dixon Ave. W., Charlevoix, Mich.

Filed June 23, 1958, Ser. No. 743,894

11 Claims. (Cl. 200—61.35)

The present invention relates to a unique switch for manual selective control of a plurality of electrical contacts and more particularly to a switch employing selective ball contact and wherein the ball is moved in an insulated cage to accomplish such contact.

Still more particularly the present invention relates to a novel device for use as a directional turn indicator switch for vehicles.

In the prior art directional turn indicator switches, where selectively operable plural contact systems were required, the switch and operating mechanism was highly complex and the switching equipment tended to fail by reason of fatigue, wear on the contact surfaces, and arcing deterioration at the contact points. In many prior art devices no cancelling mechanism was provided integral with the switch itself and auxiliary devices controlled the cancelling of the switch upon completion of a turn by the vehicle.

Accordingly it is among the objects of the present invention to provide a simple switch structure wherein selective contact is accomplished by the movement of a ball and wherein the movement of the ball compares favorably with snap action type structures.

It is another object to provide a switch amenable to either finger control by means of a push button, or pivotal control as by means of a lever arm.

Another object is to incorporate cancelling mechanism in the switch structure wherein the cancelling mechanism incorporates adequate over-run safety provisions while being simply actuated by contact with a projection extending from the steering column of a conventional automobile.

Still other objects include the provision of unique ball and flat spring contact arrangements where the contacts operate with a wiping action and the ball rotates during each cycle of operation to provide new moving contact surfaces so as to minimize voltage drop across the switch and to substantially eliminate arcing at the contacts.

A collateral object is to provide a moving ball switch system wherein contacts cooperating with the ball have a gripping action to provide a positive ball grip and a propulsion release.

Simplicity of casing, simplicity of circuits, and accompanying overall economy with trouble-free performance will become increasingly apparent to those skilled in the art as the description proceeds. To those in the automotive art the amenability of the switch to various mounting settings will be also apparent.

The full nature of the invention will be understood from the accompanying drawings and the following description and claims.

Figure 1 is a top plan view of the device of the present invention with the cover plate removed to demonstrate the simplicity of circuits and the gripping contactor arrangement with the ball contacts in the normal or cancelled position. In this figure, the steering column of a conventional automobile is shown in phantom line as well as a lever control handle as employed in the event that push button control is not desired.

Figure 2 is a partial full section through one of the caging slides and shows the normal or cancelled position of a switch in accord with the present invention.

Figure 3 is a partial full section through the caging slide and showing the ball finally resting in forward selected position.

Figure 4 is an expanded view of the ball as it engages a contact illustrating the off center engagement of the ball tending to rotate the ball as it moves.

Figure 5 is a cut away view of the caging slide illustrating the position of the cancelling mechanism allowing passage of the steering column control cam in one direction without interference with the selected contact.

Figure 6 is a cut away view of the caging slide as shown in Figure 5, but indicating the cancelling mechanism as returned to the neutral or normal position by reverse engagement with the rotating steering column cam.

Figure 7 is a cross section taken on line VII—VII of Figure 1 and illustrating the channelling of the switch base and cover serving to guide the caging slides.

Figure 8 is a simplified circuit diagram schematically showing the operation of the switch in an automobile directional turn indicator circuit.

Figure 9 is an exploded perspective view of the switch of the present invention illustrating an assembly relationship of the individual elements comprising a two plunger selective contact device.

General description

In general the present invention provides a simple switch arrangement for selective positioning where contact is established by lineal movement of a caged ball. Further, the ball is cupped selectively by spring contactor fingers so that the snap action spring bias of the ball is accomplished by the cupping action. As the ball moves, urged in one direction by manual bias, and urged to return by return pressure, the ball (aside from moving lineally) rotates in its cage to present a variety of wear and contact surfaces. Combining two of such switch units for independent but coordinated action with a selected circuit provides an excellent switch for automotive directional turn indicators. Where so used one of the external biasing forces is manual by the operator of a vehicle and the return bias is accomplished by camming action of the vehicle steering column moving or returning the ball caging assembly when one direction of rotation is used and not interfering with the switch position when an opposite rotation of a steering column occurs.

Specific description

Referring more specifically to the drawings and with reference to Figure 1, a switch case or base 11 is shown. The switch case 11 is generally rectangular in shape but is provided with an arcuate side 12 so as to provide nesting engagement with a cylindrical vehicle steering column tube 13. The tube 13 encloses the column shaft 14 as shown. Two parallel spaced apart recesses 15 and 16 are defined by the case 11 and run transversely through the case 11. Midway of the two extremes of the recesses 15 and 16 are enlarged openings 17 and 18, respectively. Caging slides 19 and 20 are provided for reciprocation in the recesses 15 and 16 respectively. The caging slides 19 and 20 are elongate bars defining openings 21 and 22 respectively running transversely through the slides 19 and 20 midway between their ends. The openings 21 and 22 cage balls 23 and 24 respectively so as to allow the balls 23 and 24 to freely rotate while the slides 19 and 20 urge them selectively forward or backward as will be seen. The caging slides 19 and 20 are forked at one end as shown in Figure 9. The clevis ends 25 and 26 respectively guide the slides 19 and 20 in the recesses 15 and 16 respectively and provide off center pivoting mounts for the pins 27 and 28 respectively. The clevises 25 and 26 with their respective pins 27 and 28 thus provide off-center hinging for blocks 29 and 30 respectively. Simple springs 31 and 32 respectively retained in caging slides 19 and 20 exert pressure on block members 29 and 30, respectively urging them into normal engagement against the shoulders 33 and 34 respectively of recesses 15 and 16 respectively. A relief opening 33a and 34a opposite each of the shoulders 33 and 34 permit the block members 29 and 30 to swing out of their normal position against the simple spring bias which returns the block members 29 and 30 to the normal shouldered position. This action will become clearer as the description proceeds and the assembled structure is placed in one of its operative settings as a directional turn indicator unit. It will also be appreciated that the hinging of members 29 and 30 to the respective clevises 25 and 26 is opposite but otherwise identical.

Lead posts 35, 36, 37, 38, 39 and 40 extend upward through the case 11. As illustrated in Figure 1, leads 35 and 36 are located symmetrically on the center through the switch case 11 and between the recesses 15 and 16. To the right of the center leads 35 and 36 as viewed in Figure 1 and on the right outboard side of the recess 16 are leads 37 and 38 in staggered spaced apart relationship. On the left of the center leads 35 and 36 as viewed in Figure 1 and on the outboard side of the recess 15 are leads 39 and 40 in staggered spaced apart relationship and symmetrically located with respect to the leads 37 and 38. Center lead 35 (on the steering column side of the case 11 as shown in Figure 1) is connected to a flat spring contact member 41 which is channel retained by the case 11 and extends into the recesses 15 and 16 at one extreme of the relief openings 17 and 18 respectively. The ends 42 and 43 of the member 41 are bent substantially parallel to the passages 15 and 16 and are cupped toward the centers of the passages 15 and 16 respectively.

A flat spring contact member 44 is connected at its midpoint to the lead 36 and is channel retained in the case 11. The contact 44 extends outwardly from the lead 36 extending into the recesses 15 and 16 proximate to the ends of enlarged openings 17 and 18. The contact member 44 is bent at its ends 45 and 46 to generally parallel the recesses 15 and 16. As in the case of contact member 41, the ends 45 and 46 of member 44 are cupped toward the center of the recesses 15 and 16 respectively. With reference to Figure 1, for example, it will be seen that the ends 45 and 46 are of somewhat greater length than the ends 42 and 43 of the member 41.

The lead 39, on the left side of recess 15 as seen in Figure 1 is connected to a flat spring contactor 47 which is channel contained and which extends at its end into the recess 15 generally opposite the member 44. The end 48 of the member 47 is bent to parallel in direction the end 45 of member 44. However, the end 48 of the member 47 extends for a greater length than its corresponding opposite end 45 of the member 44. Like the member 44, the end 48 of member 47 is cupped toward the center of the recess 15 and the tip 49 of the contactor 47 is curled in an outboard direction. The cupped end 48 of member 47 and the end 45 together provide a spring loaded ball pocket 49a (Fig. 4).

A flat spring contactor 50 extends from the lead 40. This contactor 50 is also channel retained and extends into the recess 15 opposite the end 42 of the member 41. The contactor 50 is provided with a bent and cupped end 51 which extends into the recess 15 and with the cupped end 42 of member 41 provides a spring loaded ball pocket 52 (Fig. 4).

To the right of the recess 16 lead posts 37 and 38 are correspondingly and generally symmetrically provided with flat spring contactors 53 and 54 respectively which extend into the recess 16 at each end of the relief opening 18. Contactor 53 is provided with a bent and cupped end 55 (Fig. 9) which generally parallels the opposite end 46 of contactor 44. A curled tip 56, rolled outwardly of the recess 16 extends the length of the member 53 in a generally parallel direction with end 46 and the end 55 with the end 46 provide a spring loaded ball pocket 57. The spring contactor 53 is channel contained in the case 11.

Flat contactor spring 54, connected to lead 38 also extends into the recess 16 opposite contactor 41. The end 58 of contactor 54 is cupped and bent to correspond with the end 43 of opposite member 41 and provides a spring loaded ball pocket 59.

A cover 60, suitably recessed to retain the caging slides 19 and 20 closes the case 11 as shown best in Figure 9.

The balls 23 and 24 are preferably of a wear resistant metallic material suitable to carry electrical current. Steel balls have proved satisfactory. The contactors are flat metal spring stock and selected with regard to their fatigue characteristics. Beryllium-copper strips have been found adequate. The lead posts are of conducting metal and may constitute sockets for the insertion of appropriate electrical leads for simple integration of the unit in a typical wiring circuit or harness where used in directional turn indicator settings.

The case 11, cover 60, caging slides 19 and 20 and cancelling blocks 29 and 30 are preferably of a plastic material selected for its electrical insulating property. Nylon, for example, has proved excellent as have other resin materials having good dimensional stability. As will be appreciated the case 11 is very amenable to mass production using conventional plastic resin forming procedures. It will also be appreciated that the structure readily admits of esthetic or design modification without departure from the mechanical heart of the device. When the caging slides 19 and 20 are in neutral position as shown in Figure 1 they extend from the case 11 so that they are useable for manual push-button control. As shown in phantomline in Figure 1, by establishing a simple pivot 61 intermediate the extensions of the caging slides 19 and 20, selective control is possible using a conventional lever 62 provided with radially extending lugs or stops 63 and 64 extending outwardly from the pivot 61, as shown.

In Figure 8 a typical electrical automotive circuit is illustrated showing the switch of the present invention selectively controlling the operation of left and right turn indicator lights while permitting continuous control over the normal tail lights so as not to interfere with constant electrical supplies to these elements and not interfere with a braking signal circuit.

*Operation*

Operation of the switch of the present invention will best be appreciated by reference to Figures 2, 3, 4, 5 and 6 in the drawings. With reference to Figure 2 the caging slide 19 is shown in the recess 17 with the ball 23 nesting in the spring loaded ball pocket 49a. The ends 45 and 48 of the contactors 44 and 47 respectively cup the ball 23 and retain it against chance dislodgment. Electrical contact is thus maintained as between posts 36 and 39. The ball 23 is of a diameter somewhat greater than the pocket 49a when the pocket 49a is not holding the ball 23. Thus, the contact of the ends 45 and 48 assures adequate contact pressure with the ball 23. It will be appreciated that the contactor ends serve as travel stops preventing escape of the ball 23 and caging slide 19 from the recess 17.

When the caging slide 19 is depressed (Figs. 3 and 4) the ball 23 is urged out of the pocket 49a and into the pocket 52 between contactors 50 and 41 where it performs an electrical contact function as between posts 40 and 35, the spring loaded cupping securing the ball 23 against chance dislodgment and applying spring contact pressure to the sides of the ball 23. In this position the ball 23 also contacts the curled spring tip 49 of contactor 47 (Figure 4). As the ball 23 moves into its position in pocket 52, the off center pressure of tip 49 tends to roll the ball presenting a new contact surface for the pocket 52. This action is smoothly accomplished so as to provide a contact wiping action as between ball 23 and the contactors 41 and 50, as shown in Figure 4. Extensive testing has indicated little or no arcing at the ball contacts indicating the efficiency of the switch in use.

The movement of the caging slide 19 into the position determined by the pocket 52 extends the cancelling block 29 of the slide 19 outside of the switch case 11 and into the path of a cam surface 65 extending radially from the steering column shaft 14. This is best illustrated by reference to Figures 5 and 6. Clockwise rotation of the shaft 14, as shown in Figure 1 causes no interference by the cam surface 65 with the ball position in pocket 52 since the block 29 on its hinge pin 27 rotates into the relief opening 33a (Fig. 5) against mild spring pressure applied by the spring 31. Passage of the cam 65 is thus made possible in a clockwise movement without disturbing switch positioning. However, as the steering column shaft 14 returns in a counterclockwise rotation as seen in Figure 1, the block 29 is pushed against the shoulder 33 in the recess 15 (Fig. 6) and a component of that rotative force is thus translated to lineal operating force and the caging slide 19 is moved to withdraw ball 23 out of the pocket 52 and into the pocket 49a. The force exerted on the ball 23 in this movement is augmented by the spring pressure of the members 42 and 51 tending to squirt the ball 23 into the pocket 49a. The pocketing action at pocket 49a by reason of the off center contact of tip 49 facilitates the return of the ball 23 to its rest position in pocket 49a.

The action during pocketing of the balls is very analogous to the action of a magnetic field on a magnetically attracted object since once the balls passes the tips of the cupped ends of the contactors, they are urged into or out of the pocket by reason of the spring pressure on each side of the ball tending to seat the ball or to discharge the ball as desired.

It will be appreciated that identical operation occurs in respect to caging slide 20 except that the hinging of block 30 is opposite to the hinging of block 29 so that counter-clockwise rotation does not interfere with the slide 20 and associated ball 24, while clockwise rotation returns the ball 24 and caging slide 20 to the normal pocketing position in pocket 57.

With reference to Figure 8 it will be seen that while the balls 23 and 24 are located in pockets 49a and 52 respectively, a closed contact exists between the selected lead posts 39, 36, and 37.

In this position the tail light circuit of an automobile is operative and the braking circuit is available for service. With the recesses 15 and 16 and the push button extension of the caging slides 19 and 20 respectively extending therefrom, the driver pushes one or the other of the buttons to selectively energize a turn signal indicating either a right or left turn. The selected movement of the actuator or caging slide moves ball 23, for example, out of the pocket 49a and into the pocket 52. This closes now a circuit involving lead posts 40 and 35 with contact retained as well with post 39. The brake circuit is still available for operation despite the new position of the ball switch member 23 and the respective turn selected is signalled. The tail light circuit to the side of the car not illuminated for turn is not interfered with. The cancelling structure returns the mechanism to pocket 49a on completion of the turn and described engagement with the block 29. A turn in the opposite direction is signalled by pushing the actuator or button 20.

The cap or cover 60 is suitably attached to the case 11 by means of a fastener 66 shown best in Figure 9. As will be appreciated the cover 60 is easily gasketed, not shown, and may be keyed to the case 11 by detents, steps, or shoulders well known in the art.

Having thus described the invention and its operation it will be appreciated that some modifications may be made within the skill of the art and such modifications are intended to be included insofar as they fall within the scope of the hereinafter appended claims.

The invention claimed is:

1. In a switch, the contact arrangement comprising: a reciprocable caging slide; a metal ball caged by said slide; a first contact pocket formed by spaced metal resilient cupped flat spring contactor ends; and a second contact pocket opening toward said first pocket and formed by other spaced resilient cupped flat spring contactor ends, both of said pockets embracing a portion of the slide and the path of said ball and selectively retaining said ball for electrical contact.

2. In a switch, the contact arrangement comprising: a caging slide reciprocable in a linear path by selected external pressure at either end; a ball caged by said slide and selectively movable therewith; a plurality of resilient contact pockets each defined by the ends of at least two contactor members and cupping said ball as it moves into one or the other of said pockets; and means accomplishing off center frictional rotation of said ball as it moves from pocket to pocket.

3. In a switch, the contact arrangement comprising: a caging member movable in a linear path and having a metal ball mounted therein; a first contact pocket formed by opposed cupped spring contact members in the path of movement of said ball; and a second contact pocket formed by opposed spring contact members in the path of movement of said ball, one of the spring contact members overlapping its opposed contact member for engaging said ball when it is located in either of said contact pockets and imparting rotational movement to said ball when it is transferred from one contact pocket to the other.

4. In a switch, the contact arrangement comprising: a movable switch actuating member mounted for reciprocating movement; a metal ball operatively associated with said actuating member for movement thereby; a first contact pocket formed by spring contactor members; and a second contact pocket formed by spring contactor members, one of said spring contactor members being formed and positioned to engage said ball during movement thereof from one contact pocket to the other for imparting rotational movement to said ball.

5. In a switch for manual selective operation, the combination, comprising: a switch case of insulating material; a pair of parallel recesses defined by said case and extending therethrough; a pair of caging slides of insulating material extending through said recesses and reciprocable in the path defined thereby; a metal ball in each of said caging slides having a diameter greater than the thickness of said slides; and a pair of contact pockets in each recess defined by at least two cupped flat spring contactor ends which resiliently receive and retain said balls as they are moved by said caging slides, at least one of the contactors in each recess being longer at its end than the other of said contactors so as to frictionally engage said balls in passing and to resiliently retain contact with said balls as they are moved.

6. In a directional turn indicator switch for manual selective operation and return by engagement with projecting means on a steering column shaft, the combination comprising: a switch case of insulating material attachable to a steering column of an automobile; a pair of parallel recesses defined by said case and extending therethrough; a pair of caging slides of insulating material extending through said recesses and reciprocable in the path defined thereby; a metal ball in each of said caging slides having a diameter greater than the thickness of said slides; a pair of contact pockets in each recess defined by at least two cupped flat spring contactor ends which resiliently receive and retain said balls as they are moved by said caging slides, at least one of the contactors in each recess being longer at its end than the other of said contactor so as to frictionally engage said balls in passing and to resiliently retain contact with said balls as they are moved; and cancelling means attached to said caging slides which extend outwardly with selected movement to return said slides when engaging an external rotative force from one direction, but releasably avoiding return when the external rotative force is applied from an opposite direction.

7. In a directional turn indicator switch for manual selective operation and return by engagement with projecting means on a steering column shaft, the combination comprising: a switch case of insulating material attachable to a steering column of an automobile; a pair of parallel recesses defined by said case and extending therethrough; a pair of caging slides of insulating material extending through said recesses and reciprocable in the path defined thereby; a metal ball in each of said caging slides having a diameter greater than the thickness of said slides; a pair of contact pockets in each recess defined by at least two cupped flat spring contactor ends which resiliently receive and retain said balls as they are moved by said caging slides; and cancelling means attached to said caging slides which extend outwardly with selected movement to return said slides when engaging an external rotative force from one direction, but releasably avoiding return when the external rotative force is applied from an opposite direction.

8. In a directional turn indicator switch for manual selective operation and return by engagement with projecting means on a steering column shaft, the combination comprising: a switch case of insulating material attachable to a steering column of an automobile; a pair of parallel recesses defined by said case and extending therethrough; a pair of switch actuating members extending through said recess and reciprocable in the path defined thereby; switch means cooperating with said switch actuating members; and cancelling means attached to said switch actuating members and movable therewith outwardly into the path of said projecting means to return said actuating members to a cancelled position when said projecting means rotates from one direction, and providing escapement for avoiding return when said projecting means rotates in the opposite direction.

9. In a plural contact switch operable by selected external pressure and returnable by a unidirectional application of rotating force, the combination including: a switch case defining at least two parallel recesses therethrough; a caging slide in each of the recesses of said case and reciprocable therein; a ball in each of said slides and reciprocable with said slide; at least two contact pockets defined by selected resilient contactor ends and cuppingly engageable with said balls as they move with said cages; a clevis on one end of said caging slides; a hinged block in said clevises forming an extension of said slides and shouldering against said recesses in said case on one side and rotatable into said case on the other side; and spring means urging said block into normal extended shouldering position against said recess in said case.

10. In a plural contact switch operable by selected external pressure and returnable by a unidirectional application of rotating force, the combination including: a switch case defining at least two parallel recesses therethrough; a switch actuating member in each of the recesses of said case and reciprocable therein; switch means operably associated with each of said actuating members; a clevis on one end of each of said actuating members; a hinged block pivotally mounted in each of said clevises forming an extension of each of said actuating members and shouldering against one wall of its associated recess and rotatable within said recess away from said wall; and spring means urging said block into normal extended shouldering position in said case.

11. In a directional turn indicator switch for manual selective operation and return by engagement with projecting means on a steering column shaft, the combination comprising: a switch case defining at least two parallel recesses therethrough; a switch actuating member in each of the recesses of said case and reciprocable therein; switch means operatively associated with each of said switch actuating members; a clevis on one end of each of said actuating members; a hinged block pivotally mounted in each of said clevises and forming an extension of said actuating members and shouldering against a wall of its associated recess and rotatable within said recess away from said wall; and spring means urging said block into normal shouldering position against said wall; said blocks being movable by said actuating members into the path of movement of said projecting means and shouldering against opposite walls of the respective recesses to provide cancelling movement of said actuating members in response to movement of said projecting means in either direction of rotation of said steering column shaft.

References Cited in the file of this patent

UNITED STATES PATENTS

| | | |
|---|---|---|
| 754,235 | Pitel | Mar. 8, 1904 |
| 1,562,745 | Dowers et al. | Nov. 24, 1925 |
| 1,903,180 | Hammerly | Mar. 28, 1933 |
| 1,956,422 | Hammerly | Apr. 24, 1934 |
| 2,246,373 | Lodge | June 17, 1941 |

FOREIGN PATENTS

| | | |
|---|---|---|
| 716,480 | France | Oct. 6, 1931 |